Figure 1:
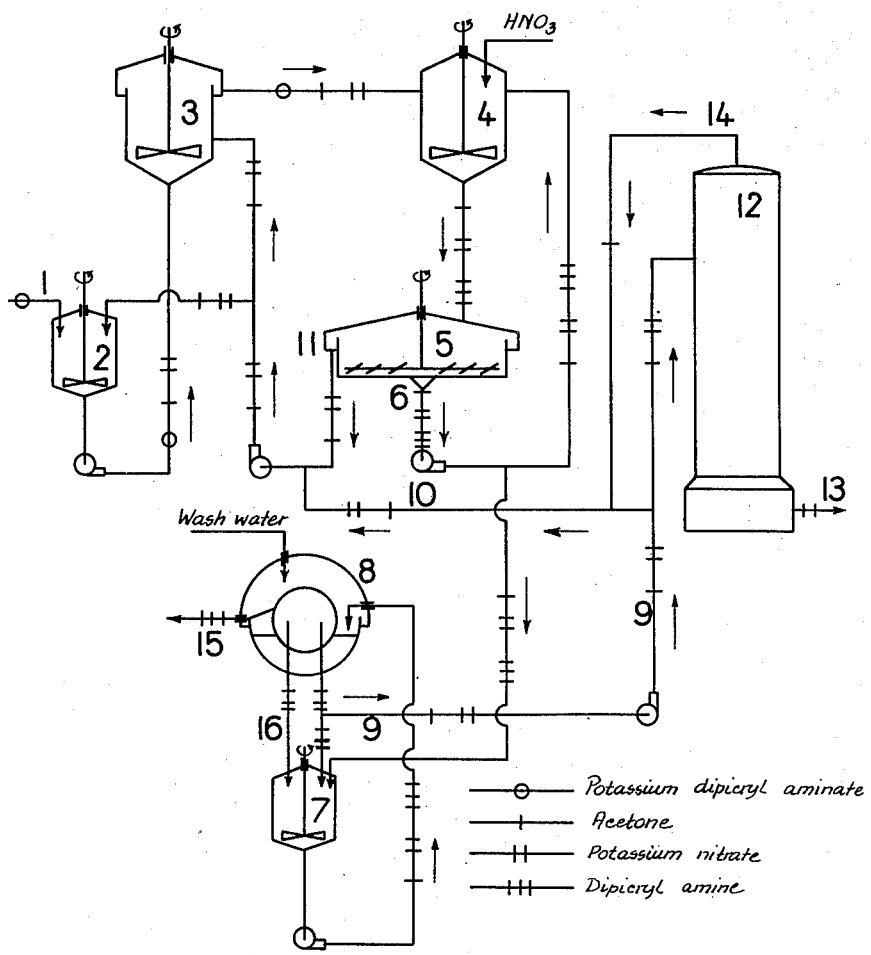

Patented May 6, 1952

2,595,568

UNITED STATES PATENT OFFICE 2,595,568

PROCESS FOR CONVERTING A POTASSIUM SALT OF A HIGHLY NITRATED SECONDARY AROMATIC AMINE TO FREE AMINE AND POTASSIUM NITRATE

Jan H. Dijkema and Jan Pluim, Haarlem, Netherlands, assignors to A/S Norduco, Oslo, Norway Application February 27, 1950, Serial No. 146,432
In the Netherlands January 31, 1949

1 Claim. (Cl. 23—102)

In Netherlands patent specifications Nos. 54,264 and 55,230 it has been proposed to precipitate potassium from seawater by means of highly nitrated secondary aromatic amines. The nonsoluble potassium salt thus obtained is then converted with a mineral acid, whereby the potassium salt of such mineral acid is obtained and the highly nitrated secondary amine is liberated again.

Further it is known that the potassium salts of highly nitrated secondary aromatic amines are soluble in acetone. In analytical chemistry this property is utilized in a process for determining potassium by conductometric titration (Zeitschrift für angewandte Chemie 49 (1936), page 829).

The invention relates to a process for converting potassium salts of highly nitrated secondary aromatic amines with mineral acids, whereby acetone is used as solvent for the potassium salt to be converted. The invention is of particular importance when the potassium salt of the highly nitrated secondary aromatic amine occurs in coarse-crystalline form. The coarse-crystalline potassium salt as such is only very slowly, or entirely not converted by mineral acids, unless the latter are used in very high concentration. By dissolving the potassium salt the reaction velocity can be greatly increased.

For the sake of brevity this specification refers to dipicryl amine where the highly nitrated secondary aromatic amines in general are meant. For the same reason nitric acid and potassium nitrate are referred to hereinafter where mineral acid and its potassium salt in general are meant.

After the conversion, the separation of the products on a technical scale meets with difficulties. The solid dipicrylamine must be separated from potassium nitrate which is in solution, if in addition to acetone there is sufficient water. The separation must be complete, on the one hand to avoid losses, on the other hand to prevent the potassium nitrate from irritating the human skin when it is used as a fertilizer. If the operation is to be profitable, it is necessary to recover the acetone completely. A great quantity of water must be evaporated and a separation between acetone and water must be effected by distillation; especially these latter operations could be expected to endanger the profitability of the process.

According to the invention the conversion of potassium dipicryl aminate with nitric acid and the separation of the reaction mixture are carried out in a special, very effective manner. The separation is complete, losses of acetone are avoided and the cost of evaporation and distillation is reduced to a minimum.

In the process according to the invention the reaction mixture is, after the conversion of potassium dipicrylaminate with nitric acid, which conversion takes place in a solution in a mixture of acetone and water, passed into a thickener. In this thickener the solid substance formed during the reaction, i. e. dipicryl amine and also potassium nitrate, if any, is concentrated. A considerable part of the acetone, which is diluted with water, flows away at the top of the thickener and is used again, without being first concentrated, for dissolving potassium dipicryl aminate.

The dipicryl amine is separated by filtration from the concentrated suspension which is drained at the bottom of the thickener. Any solid potassium nitrate which is also present is dissolved in the wash water when washing the filter cake. From the liquid obtained from the filtration, or from a part thereof, acetone is distilled off to be used again in the process in a more concentrated form.

Any such part of the liquid obtained from the filtration which is not subjected to the distillation, is circulated and is mixed with potassium dipicryl aminate, together with the concentrated acetone recovered by distillation.

The distillation process gives a residue consisting of a solution of potassium nitrate in water, from which potassium nitrate is recovered by evaporation. To reduce the cost of evaporation it is desirable that the concentration of the potassium nitrate solution to be produced should be maintained at a high level. It is therefore advisable to introduce as little water as possible into the system. For this purpose the potassium dipicryl aminate is applied in the form of a concentrated slurry or a moist crystalline mass and nitric acid of fairly high concentration, for example containing between 40 and 65% $HNO_3$, is used, so that, in addition to the water to be introduced into the system as a component of the said slurry and of the nitric acid, only a part of the wash water used in the filtering process need be evaporated.

The above-described effort to economize on heat also entails that the solution of potassium nitrate in acetone water, which is mixed with potassium dipicryl aminate, should preferably be saturated with potassium nitrate.

In this case the reaction of potassium dipicryl aminate with nitric acid results in the formation of crystallized potassium nitrate.

Suitable weight ratios between water and acetone in the reaction mixture vary from 60:40 to 70:30. Lower acetone contents cause the solubility of potassium dipicryl aminate to be poor. A quantity of from 40 to 60 weight per cent of acetone in the mixture of acetone and water causes demixing owing to the presence of potassium salts, which interferes with the regularity of the process. Acetone contents of more than 60% have the disadvantage of a high acetone vapour pressure, which gives rise to losses.

The process will now be illustrated with reference to the diagram in Figure 1. Potassium dipicryl aminate is supplied at 1 in the form of a moist crystalline mass, to which, in stirrer tanks 2 and 3, a mixture of water and acetone, containing potassium nitrate in solution, is added. The resultant solution of potassium dipicryl aminate then flows into reaction vessel 4, where at the same time nitric acid is added. After the reaction the mixture thus obtained is passed into thickener 5. Part of the concentrated suspension discharged by this thickener at 6 is preferably recycled into reaction vessel 4, with a view to increasing the rate of crystallization and the size of the dipicryl amine crystals and of potassium nitrate, if any. The remainder of the concentrated suspension discharged at 6 is passed into stirrer tank 7, from where the suspension is conducted to filter 8. The filtrate is discharged via line 9. Part of this filtrate can be recycled to stirrer tank 7, another part can via line 10, and united with the liquid overflowed from the thickener at 11, be passed back to stirrer tanks 2 and 3.

The remainder of the filtrate is passed to distilling column 12, from which a solution of potassium nitrate in water is drained off at 13 and a vapour with relatively high acetone content escapes at 14. After condensation the distilled acetone is likewise recycled to stirrer tanks 2 and 3. From the filter cake which has formed on filter 8 potassium nitrate and acetone are removed by washing. The dipicryl amine is discharged at 15. The wash water is passed via line 16 to stirrer tank 7.

Figure 2:
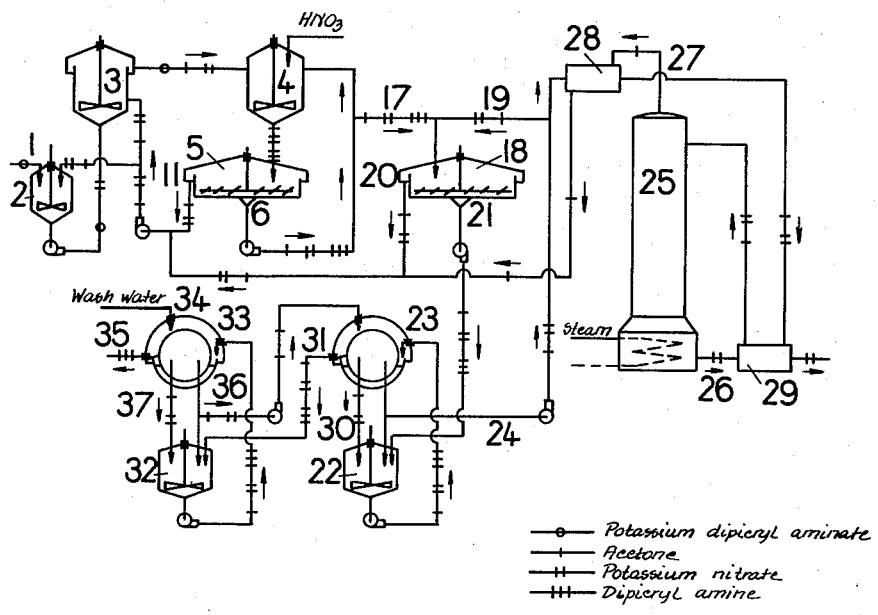

The diagram shown in Figure 2 is somewhat more complicated. In this case potassium dipicryl aminate is fed at 1, mixed in stirrer tanks 2 and 3 with an acetone-water mixture containing potassium nitrate in solution, and converted with nitric acid in reaction vessel 4. The reaction mixture is discharged into thickener 5, from which at 6 a concentrated suspension is drained off. Part of this concentrated suspension is preferably circulated to reaction vessel 4. The remainder is conducted via line 17 to thickener 18, together with a liquid, supplied via line 19, having a lower acetone content than the liquid phase of the suspension in line 17. The liquid which leaves thickener 18 at 20 is united with the solution flowing from thickener 5 at 11 and recycled to stirrer tanks 2 and 3. The concentrated suspension which is drained from thickener 18 at 21 is passed into stirrer tank 22, and thence to filter 23. The filtrate is discharged via line 24. Part of this filtrate can be passed back to stirrer tank 22. Another part forms the solution which is fed, via line 19, to the suspension passing through line 17 to thickener 18. The remainder of the filtrate is passed to distilling column 25, from which a solution of potassium nitrate in water is drained off at 26 and a vapour of relatively high acetone content escapes at 27.

After condensation the distilled acetone is likewise recycled to stirrer tanks 2 and 3. At 28 there is exchange of heat between the liquid to be distilled and concentrated acetone, at 29 between the liquid to be distilled and the acetone-free potassium nitrate solution. From the filter cake formed on filter 23 potassium nitrate and acetone are removed by washing. The wash liquid is passed via line 30 to stirrer tank 22. The dipicryl amine is discharged at 31 and conducted to stirrer tank 32, in which it is again suspended. The dipicrylamine is then passed in the form of a suspension to filter 33. The filter cake formed thereon is washed with water supplied at 34. The filter cake is then removed from the filter at 35. Part of the filtrate of filter 33 flows to stirrer tank 32; the remainder is discharged via line 36 to serve as wash liquid for filter 23. The wash water of filter 33 is passed via line 37 into stirrer tank 32.

As an example the following figures can be stated with reference to the diagram of Figure 2. At 1 a quantity of 59.3 tons of potassium dipicryl aminate is supplied per hour, mixed with 14.8 tons of water. Potassium dipicryl aminate is mixed in stirrer tanks 2 and 3 with 1004 tons of a solution which contains 375 tons of acetone and is saturated with potassium nitrate. 74 tons of this solution are passed into stirrer tank 2, the remainder into stirrer tank 3. 14.7 tons of nitric acid of fairly high concentration (7.8 tons $HNO_3$ and 6.9 tons $H_2O$) are fed into reaction vessel 4. 956 tons of liquid are discharged from thickener 5 at 11. Through line 17 pass: 54.5 tons of dipicryl amine, 18.8 tons of potassium nitrate, 22.1 tons of acetone and 40.9 tons of water.

Via line 19 are supplied: 4.5 tons of potassium nitrate, 5.4 tons of acetone and 20.4 tons of water. A mixture consisting of 54.5 tons of dipicryl amine, 17.0 tons of potassium nitrate, 20.1 tons of acetone and 44.7 tons of water leaves thickener 18 at 21. In this example the filter installation consists of three filters connected in series while Figure 2 only shows two filters. Consequently, after leaving filter 33 the dipicryl amine is suspended again and filtered with a view to further reducing any content of potassium nitrate and acetone contained therein. 54.5 tons of wash water are fed to the filter installation, 23.1 tons of which leave the filter installation again together with the dipicryl amine. Line 24 conveys 112.9 tons of liquid consisting of 14.9% of potassium nitrate, 17.7% of acetone and 67.4% of water; 82.6 tons of this mixture are distilled; leaving a solution of 12.3 tons of potassium nitrate in 53.1 tons of water, which solution leaves column 25 at 26, while 17.2 tons of vapour containing 14.6 tons of acetone are ejected.

The distillation calls for 9 tons of steam. All quantities stated are understood to be per hour.

From the diagrams and from the example it is clear that only a very small fraction of the quantity of acetone circulating in this process need be subjected to distillation. Further it is of great importance that the concentration of acetone in the vapour which leaves the distilling column need not be particularly high. It is only essential that the solution which leaves the column at the bottom should be free of acetone. Consequently, the column can be fitted with only a small number of trays.

To avoid acetone losses by evaporation, stirrer tanks, thickeners and filters must be kept closed. Rotating vacuum filters are suitable for the filtering operation.

The thickeners referred to in the specification are circular shallow tanks with preferably somewhat conical bottom and fitted with a stirrer which impels the settled precipitate towards the central discharge. The thickeners are as such known apparatuses, with the development of which particularly the name of Dorr is associated.

We claim:

A process for converting a potassium salt of a highly nitrated secondary aromatic amine with nitric acid, comprising the steps of bringing said potassium salt of said amine in the form of a concentrated moist crystalline mass into contact with a substantially saturated solution of potassium nitrate in a mixture of water and acetone, so as to dissolve said potassium salt of said amine, adding nitric acid in an amount which is stoichiometrically equivalent to the present quantity of said potassium salt of said amine, with the object of decomposing said potassium salt of said amine, whereby nitrate of potassium is formed while said free amine is liberated, the proportion of water and acetone added to the said potassium salt of said amine being such as to constitute, together with the amount of water introduced as a part of the said moist crystalline mass and the amount of water admixed with the nitric acid, a mixture wherein the weight ratio water:acetone varies between 60:40 and 70:30, passing the reaction mixture to a thickener, removing from the top of said thickener a considerable part of the aqueous acetone, conveying said aqueous acetone, without concentrating the same, back to the dissolving step for re-use as solvent for said potassium salt of said amine, discharging the concentrated suspension at the bottom of the thickener, subjecting said concentrated suspension to a separation process, thereby separating the solids from the liquid, distilling off acetone from the latter, recycling the obtained concentrated acetone in the process for dissolving new amounts of said potassium salt of said amine and recovering the potassium nitrate from the residue obtained after said distillation process.

JAN H. DIJKEMA.
JAN PLUIM.

REFERENCES CITED

The following references are of record in the file of this patent:

UNITED STATES PATENTS

| Number | Name | Date |
|---|---|---|
| 2,258,381 | Fleischer et al. | Oct. 7, 1941 |